(12) United States Patent
Qi et al.

(10) Patent No.: US 7,996,267 B2
(45) Date of Patent: Aug. 9, 2011

(54) UTILIZING A FORWARD LOOKING NASH EQUILIBRIUM IN AN AD-WORDS AUCTION

(76) Inventors: Qi Qi, Shanghai (CN); Tian-Ming Bu, Shanghai (CN); Xiaotie Deng, Kowloon (HK)

( * ) Notice: Subject to any disclaimer, the term of this patent is extended or adjusted under 35 U.S.C. 154(b) by 0 days.

(21) Appl. No.: 12/436,700

(22) Filed: May 6, 2009

(65) Prior Publication Data
US 2009/0281912 A1 Nov. 12, 2009

Related U.S. Application Data

(60) Provisional application No. 61/051,144, filed on May 7, 2008.

(51) Int. Cl.
*G06Q 30/00* (2006.01)
(52) U.S. Cl. .......................................................... 705/26
(58) Field of Classification Search .................... 705/26, 705/27
See application file for complete search history.

(56) References Cited

U.S. PATENT DOCUMENTS

2009/0055268 A1* 2/2009 Knoller et al. .................. 705/26
2010/0306210 A1* 12/2010 Wang et al. .................... 707/759

OTHER PUBLICATIONS

Tian-Ming Bu, Xiaotie Deng, Qi Qi, Dynamics of Strategic Manipulation in Ad-Words Auction, Proceedings of the 16th International World Wide Web Conference, May 8-12, 2007, Alberta, Canada.

* cited by examiner

*Primary Examiner* — Mila Airapetian

(57) ABSTRACT

Systems and methods for facilitating more efficient bidding in an ad-words auction are described herein. An auctioning component can employ a forward-looking Nash equilibrium to facilitate an ad-words auction. A bidding component can enable bidding agents to place bids in the ad-words auction as a function of dynamically considering at least existing strategies of other bidding agents and future responses of the other bidding agents. Bidding agents associated with bids comprising higher true private values can obtain advertisement slots within the ad-words auction that are associated with a higher order of attractiveness to viewers—a bidding agent's true private value can be based on, at least in part, the bidding agent's estimate of value that at least one user interested in a particular keyword places on the bidding agent's product(s) and/or service(s).

20 Claims, 11 Drawing Sheets

_US 7,996,267 B2_

UTILIZING A FORWARD LOOKING NASH EQUILIBRIUM IN AN AD-WORDS AUCTION

CROSS-REFERENCE

This application claims the benefit of U.S. Provisional Patent Application Ser. No. 61/051,144, filed on May 7, 2008, entitled "UTILIZING A FORWARD LOOKING NASH EQUILIBRIUM IN AN AD-WORDS AUCTION." The entirety of the aforementioned application is incorporated by reference herein.

BACKGROUND

Internet advertisement market models relate to advertisers that sponsor link(s) displayed in a World Wide Web space. Internet advertising usually centers upon a user submitting a keyword to a search engine. In addition to information provided by the search engine, links associated with sponsor web pages are displayed to entice the user to click on the sponsored links, directing the user to sponsor web pages. An ad-words auction, or position auction, awards advertisement slots within a World Wide Web display space in decreasing order of attractiveness to viewers.

Advertising cost is commonly referred to as "pay-per-click," in which an advertiser pays according to the number of times a link sponsored by the advertiser is clicked. Further, conventional search engines have adopted a discriminative charging scheme, ranking displayed link positions according to an expected frequency that a web-link placed at a particular position will be clicked. Generally, web-links allocated at higher ranked positions will generate more clicks and thus more revenue because sponsors are asked to pay more for web-links placed at higher ranked positions.

An advertiser estimates a value that users interested in a particular keyword place on the advertiser's product(s) and/or service(s); however, the advertiser may not want to reveal this unique, or private, value. Further, an advertiser's utility, or payoff, in bidding on a position of a particular web-link can be based on the advertiser's private value, the frequency that the web-link is clicked on by a user, and the price charged to the advertiser (determined by the winning bid amount). Moreover, the bidding strategies of advertisers (or agents) within a position auction can be modeled as a pure Nash equilibrium, in which an agent will choose a strategy that maximizes the agent's own utility with respect to a given set of strategies of other players. However, in a pure Nash equilibrium, each bidder is assumed to be myopic. In other words, assuming each bidder knows the equilibrium strategies of other players, no player will benefit from changing their bid.

One problem with position auction bidding, as conventionally modeled by the pure Nash equilibrium, is that a pure Nash equilibrium may not be reached when participating bidding agents submit their bids dynamically. Another problem with position auction bidding, as conventionally modeled by the pure Nash equilibrium, is that even if a pure Nash equilibrium is achieved, optimal agent utility is not maximized since myopic bidders of a pure Nash equilibrium do not consider the influence their bids have on future decisions of other bidders.

It is therefore desirable to have systems and methods for optimizing bidding agent utility in an ad-words auction.

BRIEF DESCRIPTION OF THE DRAWINGS

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

Non-limiting and non-exhaustive embodiments of the present disclosure are described with reference to the following figures, wherein like reference numerals refer to like parts throughout the various views unless otherwise specified.

DETAILED DESCRIPTION

Figure 1:
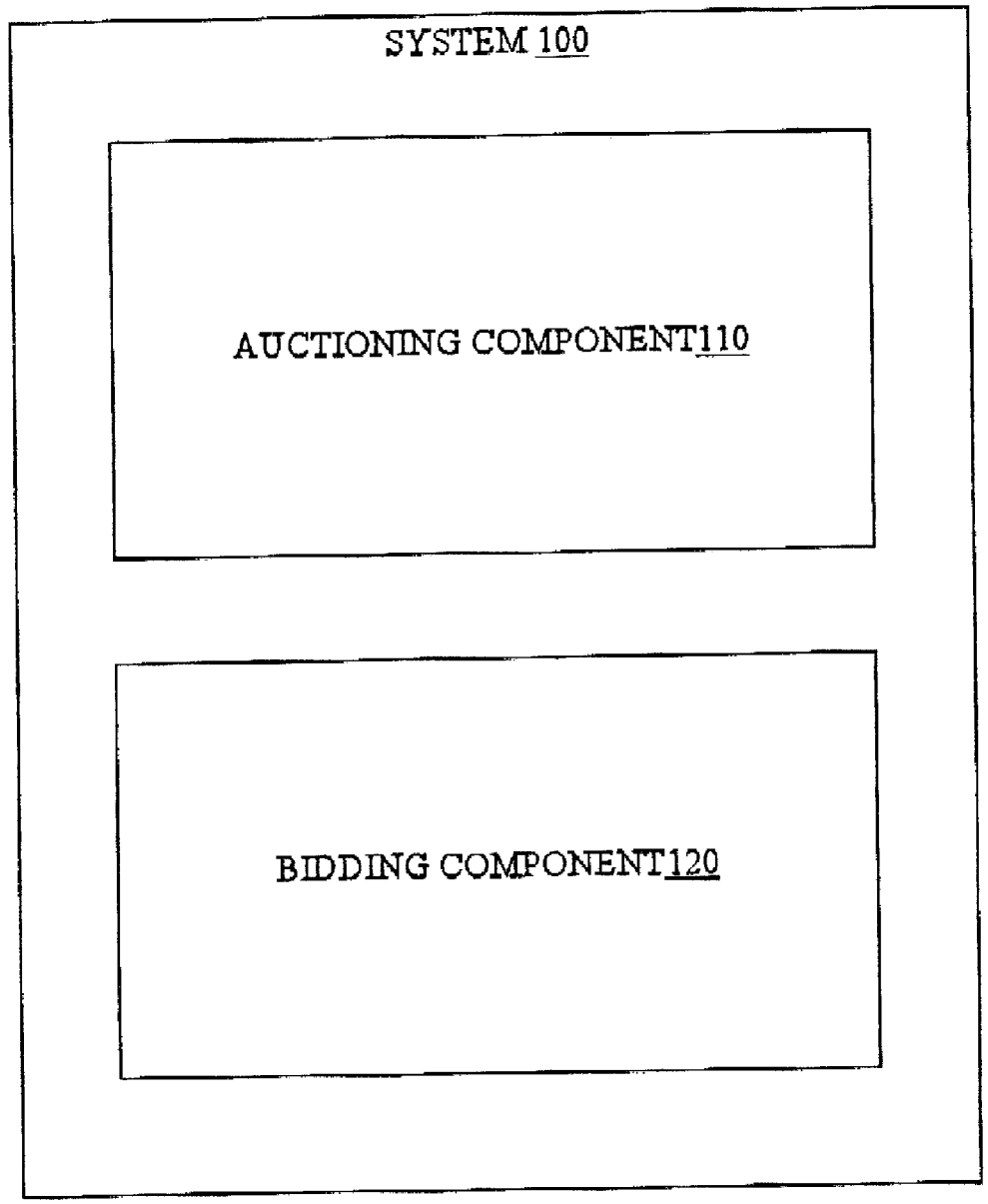
FIG. 1 is a demonstrative system for optimizing bidding agent utility in an ad-words auction, in accordance with an embodiment of the present disclosure.

The following presents a simplified summary of the innovation in order to provide a basic understanding of some aspects described herein. This summary is not an extensive overview of the disclosed subject matter. It is not intended to identify key or critical elements of the disclosed subject matter or delineate the scope of the subject innovation. Its sole purpose is to present some concepts of the disclosed subject matter in a simplified form as a prelude to the more detailed description that is presented later.

The claimed subject matter relates to systems and methods for facilitating more efficient bidding in an ad-words auction. Conventional techniques that model ad-words auctions limit the utility, or payoff, that bidding agents can obtain because bidding agents may not bid their true private values. Further, current ad-words modeling techniques prevent maximization of bidding agent utility because bidding agents do not consider the influence that their bids have on future decisions of other bidders.

Compared to current position auction technology, the novel systems and methods of the claimed subject matter maximize bidding agent utility by utilizing a forward-looking Nash Equilibrium. Unlike conventional bidding agent technology, bidding agent utility is maximized because agents consider the effects of existing strategies and potential future responses of other agents. In addition, the novel systems and methods of the claimed subject matter are well suited for online ad-words auctions and improve bidding agent utility by allowing for a dynamic outcome of rational strategic manipulations by participating bidding agents.

The present disclosure provides systems and methods for facilitating more efficient bidding in an ad-words auction. In accordance with one aspect of the disclosed subject matter, an auctioning component can employ a forward looking Nash equilibrium to facilitate an ad-words auction of advertising slots. Further, a bidding component can enable bidding agents to place bids in the ad-words auction as a function of dynamically considering at least existing strategies of other bidding agents and future responses of the other bidding agents.

In accordance with another aspect of the disclosed subject matter, the bidding component can enable bidding agents associated with bids comprising higher true private values to obtain advertisement slots within the ad-words auction that are associated with a higher order of attractiveness to viewers—a bidding agent's true private value based on, at least in part, the bidding agent's estimate of value that at least one user interested in a particular search keyword places on the bidding agent's product(s) and/or service(s). In accordance with yet another aspect of the disclosed subject matter, the bidding component includes a profit maximizing component that can enable a bidding agent to maximize the bidding agent's utility in bidding on a position of an advertisement slot. According to one aspect of the disclosed subject matter, the profit maximizing component can enable the bidding agent to maximize the bidding agent's utility based on at least one of the following: the bidding agent's true private value, an expected frequency a web-link will be selected, or a price charged to the bidding agent associated with a winning bid.

According to another aspect of the disclosed subject matter, the profit maximizing component can enable the bidding agent to maximize the bidding agent's utility by inducing at least one other bidding agent to abandon a present bid—the at least one other bidding agent placing a future bid lower in value than the present bid. According to yet another aspect of the disclosed subject matter, the bidding component includes a forward-looking best-response component that can enable the bidding agent to place bids based on, at least in part, a forward-looking best-response function. In accordance with one aspect of the disclosed subject matter, a randomized readjustment component can enable a plurality of bidding agents to place their bids simultaneously. According to another aspect of the disclosed subject matter, an update component can enable the bidding agent to update a bid in the ad-words auction based on, at least in part, a Lowest-First updating rule.

Embodiments of systems and methods for facilitating more efficient bidding in an ad-words auction are described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present disclosure. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a process running on a processor, a processor, an object, an executable, a program, and/or a computer. By way of illustration, an application running on a server and the server can be a component. One or more components can reside within a process and a component can be localized on one computer and/or distributed between two or more computers.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. For example, in one embodiment, an artificial intelligence system can be used utilized in accordance with system 600 described below (e.g., artificial intelligence component 610) to automatically enable bidding agents to place bids based on a forward-looking best response function, place bids simultaneously, and/or update bids based on a Lowest-First updating rule.

Further, as used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices (e.g., hard disk, floppy disk, magnetic strips), optical disks (e.g., CD, DVD), smart cards, and flash memory devices (e.g., card, stick, key drive).

The present disclosure provides systems and methods that maximize bidding agent utility by employing a forward-looking Nash Equilibrium in an ad-words auction. To this end, embodiments of the present disclosure include techniques for enabling bidding agents to bid their true private values. Further, embodiments of the present disclosure include techniques for enabling bidding agents to consider the influence that their bids have on future decisions of other bidders. FIG. 1 is a demonstrative system 100 for optimizing bidding agent utility in an ad-words auction, in accordance with an embodiment of the present disclosure. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

System 100 illustrated by FIG. 1 can include an auctioning component 110 that employs a forward looking Nash equilibrium to facilitate an ad-words auction. Conventional position auction bidding modeled by the pure Nash equilibrium does not optimize bidding agent utility because the indirect influence bids have on others' future bidding decisions is not considered. Unlike conventional bidding agent technology, the claimed subject matter maximizes bidding agent utility because bidding agents are enabled to consider the effects of existing strategies and potential future responses of other bidding agents. System 100 can further includes a bidding component 120 that enables bidding agents to place bids in the ad-words auction as a function of dynamically considering at least existing strategies of other bidding agents and future responses of the other bidding agents. As such, system 100 is well suited for online ad-words auctions and improves bidding agent utility by allowing for a dynamic outcome of rational strategic manipulations by participating bidding agents.

Figure 2:
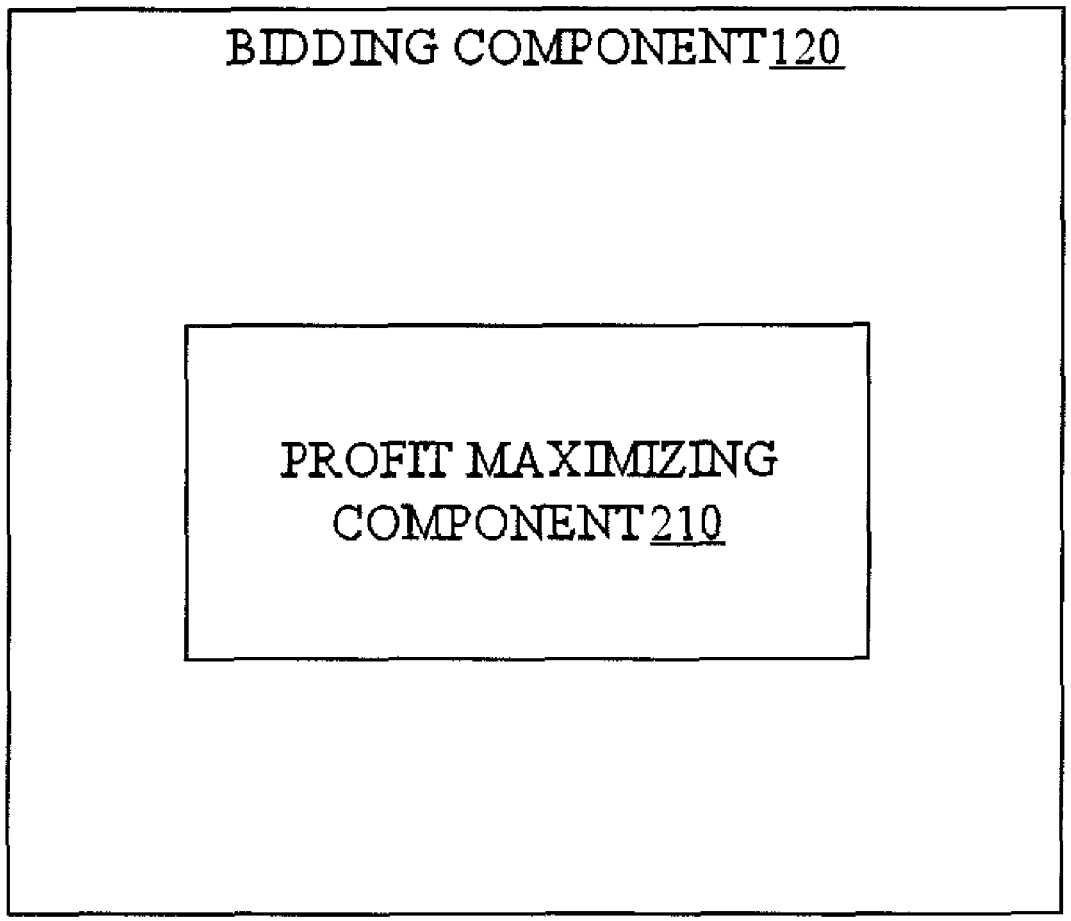
FIG. 2 illustrates a bidding component of a system for optimizing bidding agent utility in an ad-words auction, in accordance with an embodiment of the present disclosure.

In one embodiment, bidding component 120 can enable bidding agents associated with bids comprising higher true private values to obtain advertisement slots within the ad-words auction that are associated with a higher order of attractiveness to viewers—a bidding agent's true private value based on, at least in part, the bidding agent's estimate of value that at least one user interested in a particular search keyword places on the bidding agent's product(s) and/or service(s). In another embodiment of the present disclosure illustrated by FIG. 2, bidding component 120 can include a profit maximizing component 210 that enables a bidding agent to maximize the bidding agent's utility in bidding on a position of an advertisement slot. In yet another embodiment, profit maximizing component 210 can enable the bidding agent to maximize the bidding agent's utility based on at least one of the following: the bidding agent's true private value (see supra); an expected frequency an advertisement slot in the form of a web-link will be selected; or a price charged to the bidding agent associated with the winning bid.

In yet another embodiment, profit maximizing component 210 can enable the bidding agent to maximize the bidding agent's utility by inducing at least one other bidding agent to abandon a present bid—the at least one other bidding agent placing a future bid lower in value than the present bid. Thus, the claimed subject matter avoids the disadvantages of conventional ad-words auction technology modeled under a pure Nash equilibrium by allowing bidding agents to reach optimal utility through considering the influence their bids have on future decisions of other bidders. The following example illustrates how profit maximizing component 210 can enable bidding agents to maximize their profits over conventional bidding technology.

For example, consider three advertisers i=1, 2, and 3 that place bids $b^i$ for two advertisement slot positions A and B located on a web page. The frequency c that advertisement slots A and B will be clicked upon is 20 and 10, respectively. An advertiser's true private value $v^i$ is based on, at least in part, the advertiser's estimate of value that at least one user interested in a particular search keyword places on the bidder's product(s) and/or service(s). The true private value $v^i$ of advertisers 1, 2, and 3 is $v^1$=$5, $v^2$=$4, and $v^3$=1, respectively. The utility $u^i$ of an advertiser is c×(v−p), in which p is the price charged per click on a web link associated with an advertisement slot position. Assume an initial set of bids ($b^i$) for the advertisement slots is $b^1$=$2, $b^2$=$4, and $b^3$=$1 for advertisers 1, 2, and 3, respectively. In this case, advertiser 2 would win higher advertisement slot position A and advertiser 1 would win lower advertisement slot position B. Also, assuming a price p of $2 and $1 for advertisement slots A and B, respectively, advertiser 1's utility is $u^1$=10×($5−$1)=$40, while advertiser 2's utility is $u^2$=20×($4−$2)=40. However, if advertiser 1 bid a value $b^1$ higher than $4 while all other bids are fixed, advertiser 1 would win advertisement slot position A, but at a reduced utility $u^1$=20×($5−$4)=20. Similarly, if advertiser 2 bid a value $b^2$ lower than $2, the maximum utility that advertiser 2 could obtain would be $u^2$=10×($4−$1)=30. Therefore, a true Nash equilibrium exists because advertiser 1 and 2 could not immediately benefit from changing a bid.

Compared to current ad-words technology, the embodiments of the present disclosure maximize bidding agent utility by enabling a bidding agent to take into account the bidding agent's effect on the behavior of other bidding agents. Referring to the example above, if advertiser 1 increased its bid to $2.8, reflecting a higher utility $u^1$=20×($5−$2.8)=44, advertiser 2's utility would decrease to $u^2$=20×($4−$2.8)=24. If advertiser 2 abandoned the higher advertisement slot position B and selected lower advertisement slot position A at a bid of $2, advertiser 2's utility would be $u^2$=10×($4−$2)=30. Thus, advertiser 2 would chose to abandon the higher advertisement slot position B at a bid of $2.8 and select advertisement slot position A for a bid of $1. Moreover, advertiser 1's results in increased profits by taking into account the affect that advertiser 1's increased bidding would have on advertiser 2.

Figure 3:
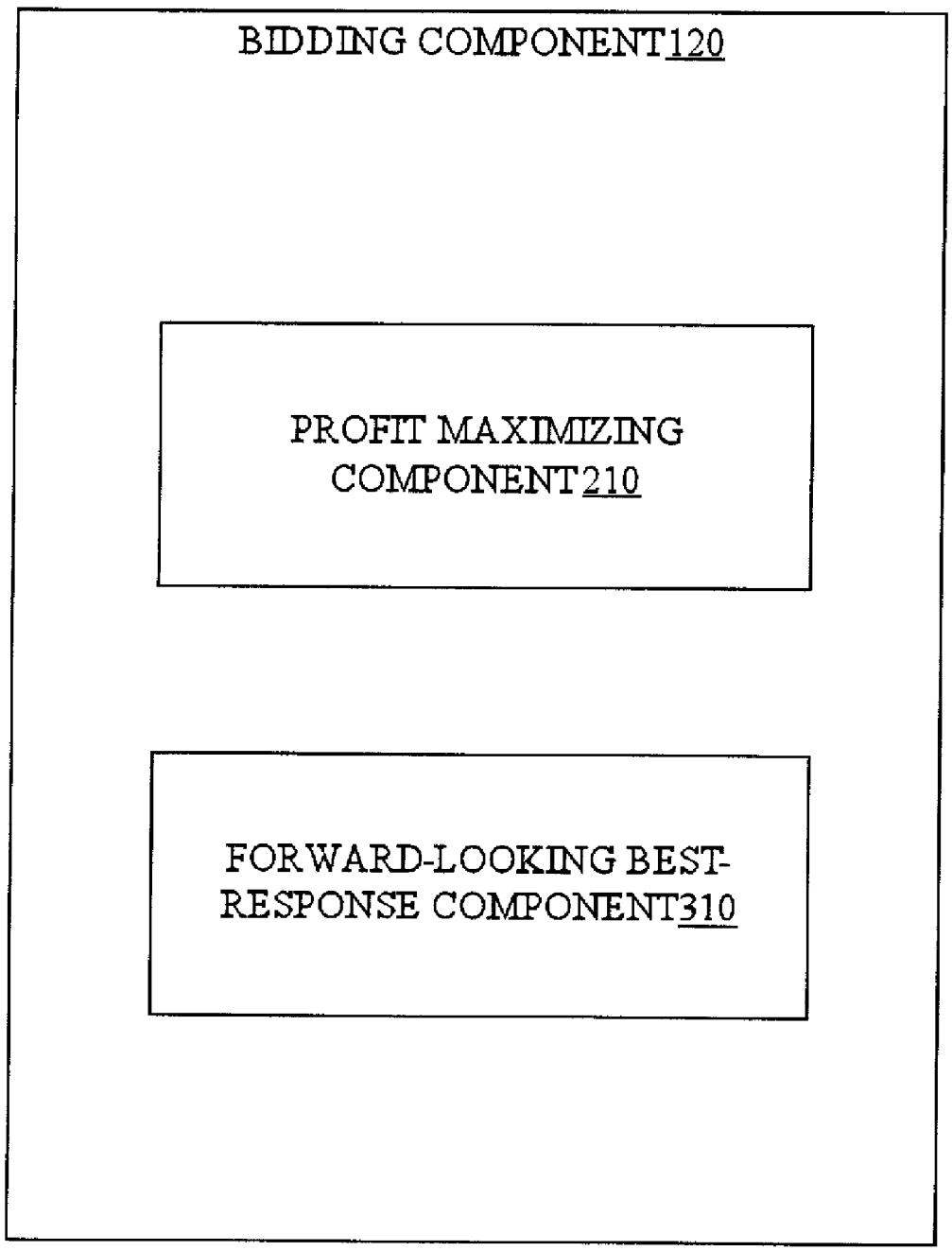
FIG. 3 illustrates another bidding component of a system for optimizing bidding agent utility in an ad-words auction, in accordance with an embodiment of the present disclosure.

FIG. 3 illustrates another bidding component 120 of a system 300 for optimizing bidding agent utility in an ad-words auction, in accordance with an embodiment of the present disclosure. Bidding component 120 can include a forward-looking best-response component 310 that can enable a bidding agent to bid based on, at least in part, a forward-looking best-response function. The forward-looking best-response function utilizes privately known information of the bidding agent that represents an expected return to the bidding agent per selection (e.g., click) associated with an advertisement slot. Moreover, the forward-looking best-response function utilizes a next highest bid in a descending bid queue when there is more than one advertisement slot in the ad-words auction. Elaborating on the example above, since advertiser 2's utility in the equilibrium depends on advertiser 1's bid, advertiser 1 would increase its bid so high as to compel advertiser 2 to abandon the higher slot, instead of bidding a value higher than $4 to directly obtain the higher slot. On the other hand, since advertiser 1's payoff (utility) may depend on advertiser 2's bid in the next step, advertiser 2 would not infinitely raise its bid. However, forward-looking best-response component 310 can enable advertiser 1 to adopt the following strategy, assuming the difference between any two bids is at least $0.01. Starting with a bid $b^1 = \$2$, advertiser 1 can increase a current bid by $0.01. Next, advertiser 1 can check whether advertiser 2's utility would decrease if advertiser 2 bid a value close to advertiser 1's bid. In the example above, advertiser 1 could reference the following equation:

```
1:   while advertiser 2 wouldn't like to abandon a higher slot
2:   do
3:       b' = b¹ + $0.01
4:       if (20 × (5 − (b' − 0.01))) < ((5 − 1) × 10) then
5:           jump out of the loop
6:       else
7:           let b¹ = b' and submit a new bid b'
8:       end if
9:   end while
```

According to the above strategy, advertiser 2 wouldn't abandon the higher slot until advertiser 1 increased its bid to $2.51. In this case, advertiser 1's utility will be at least $u^1 = 20 \times (\$5 - \$2.5) = 50$, which is one fourth larger than that in the initial myopic stable status described above.

In one embodiment of the present disclosure, forward-looking best-response component 310 can enable the bidding agents to place bids based on, at least in part, the following forward-looking best-response function:

$$F^i(b^{-i}) = \begin{cases} v^i - \dfrac{c_k}{c_{k-1}}(v^i - b_{k+1}) & 2 \leq k \leq K \\ v^i & k = 1 \text{ or } k > K \end{cases},$$

wherein $b^{-i} = (b^1, \ldots, b^{i-1}, b^{i+1}, \ldots, b^N)$ denotes the bids of all bidders other than bidder i;

$v^i$ is privately known information of bidder i that represents the expected return per-click to bidder i;

k is an advertisement slot of a set of advertisement slots $\{1, 2, \ldots, K\}$;

$c_k$ is the click rate of advertisement slot k in a descending click rate queue, the advertisement slot k won by bidder i;

$c_{k-1}$ is the click rate of an advertisement slot k−1 in the descending click rate queue, $c_{k-1}$ larger than $c_k$; and $b_{k+1}$ is the next highest bid in a descending bid queue.

Figure 4:
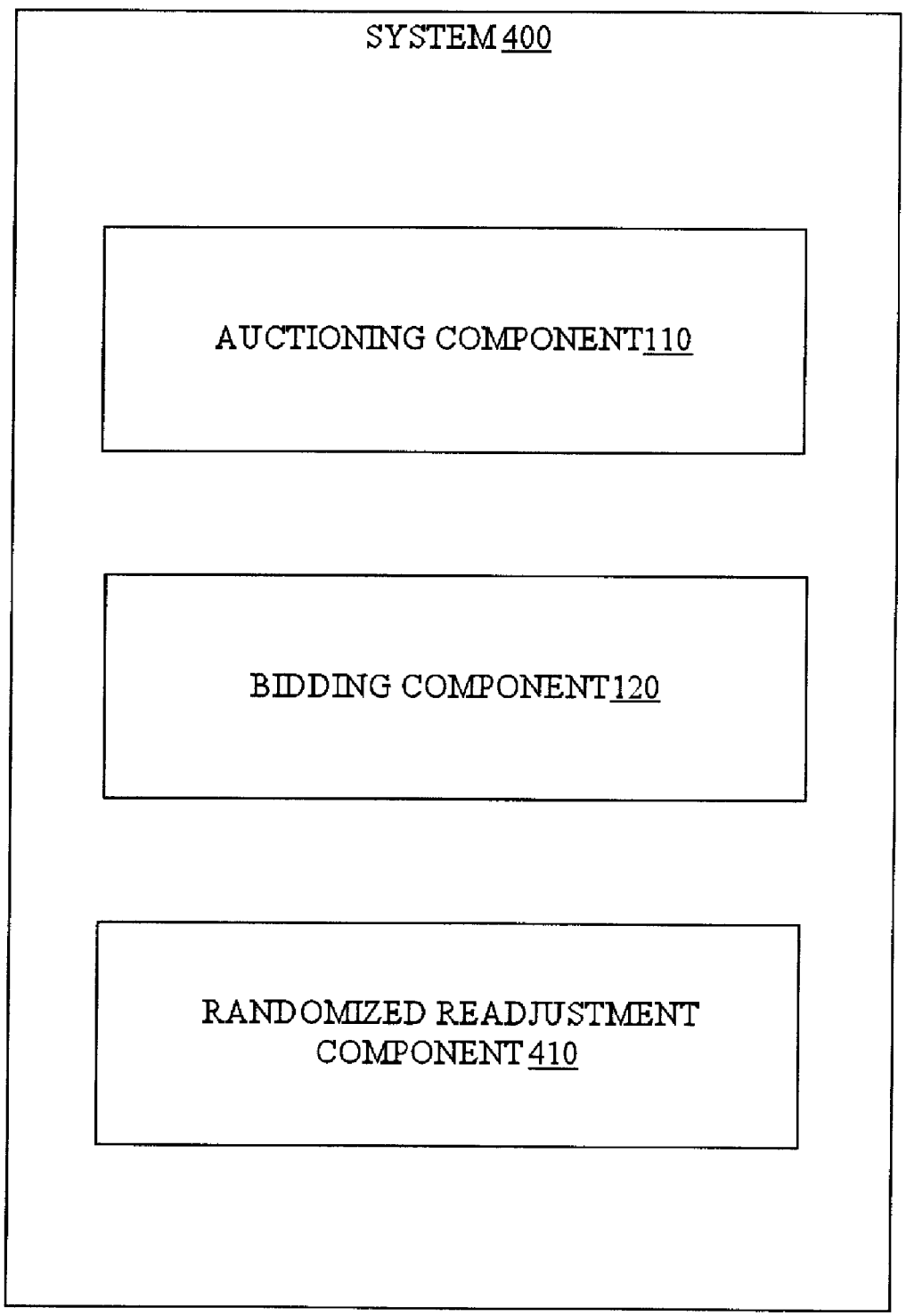
FIG. 4 illustrates a demonstrative system that includes a randomized readjustment component for optimizing bidding agent utility in an ad-words auction, in accordance with an embodiment of the present disclosure.

FIG. 4 illustrates a demonstrative system 400 that includes a randomized readjustment component 410 for optimizing bidding agent utility in an ad-words auction, in accordance with an embodiment of the present disclosure. As described above, auctioning component 110 can employ a forward looking Nash equilibrium to facilitate an ad-words auction. Further, bidding component 120 can enable bidding agents to place bids in the ad-words auction as a function of dynamically considering at least existing strategies of other bidding agents and future responses of the other bidding agents. Randomized readjustment component 410 can allow a plurality of bidding agents to place their bids simultaneously, while still enabling a bidding agent to reach optimal utility by taking into account the bidding agent's current behavior and the bidding agent's effect on the future behavior of other bidding agents.

Figure 5:
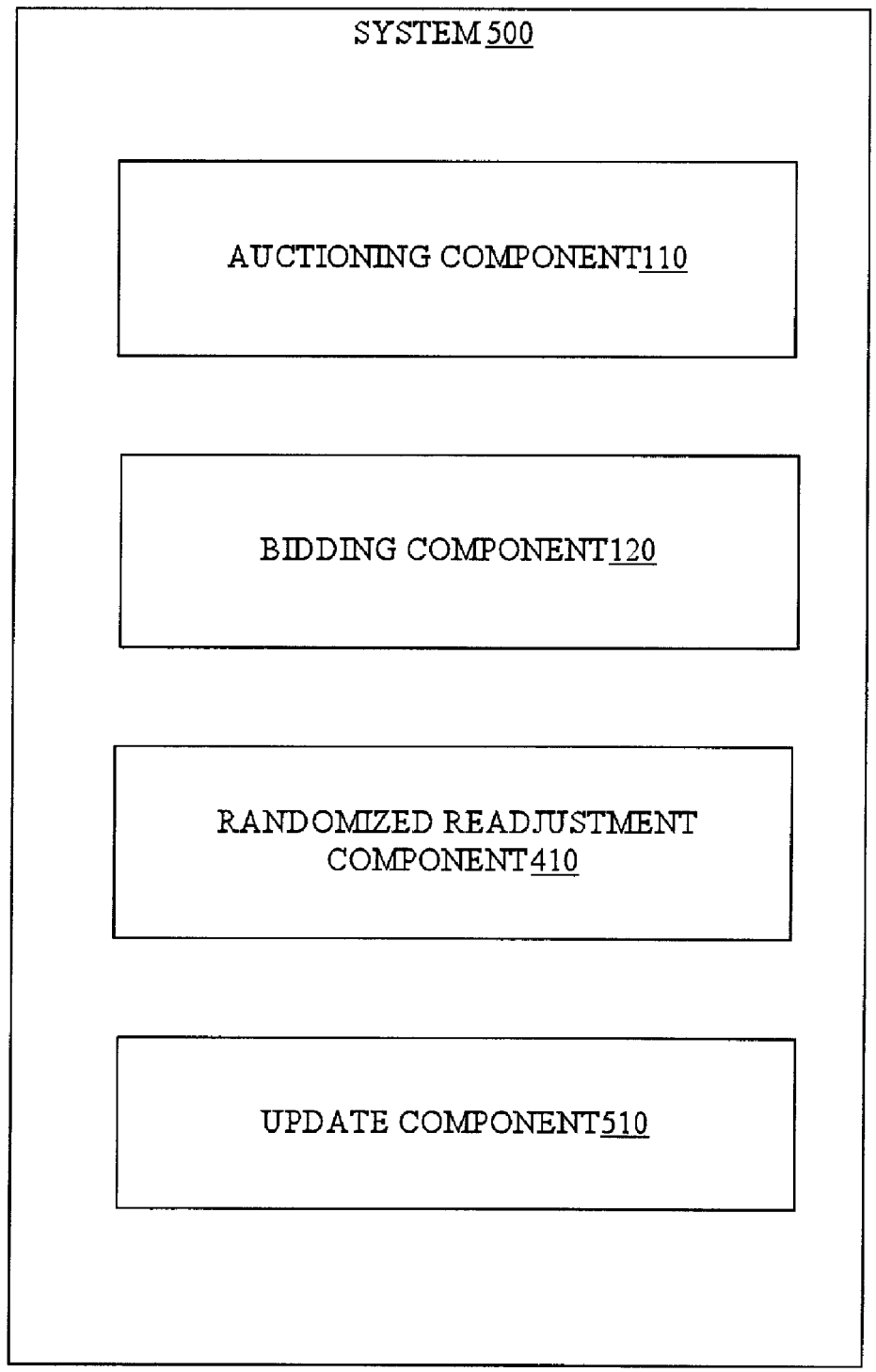
FIG. 5 illustrates a demonstrative system that includes an update component for optimizing bidding agent utility in an ad-words auction, in accordance with an embodiment of the present disclosure.

FIG. 5 illustrates a demonstrative system 500 that includes an update component 510 for optimizing bidding agent utility in an ad-words auction, in accordance with an embodiment of the present disclosure. Update component 510 can enable bidding agents to update bids in the ad-words auction based on, at least in part, a Lowest-First updating rule. In another embodiment of the present disclosure, the Lowest-First updating rule can include the following function, wherein j denotes a bid that will be updated based on the forward-looking best-response function $F^i(b^{-i})$—it is to be understood and appreciated that the numbered acts denoted in the Lowest-First function can occur in various orders and/or concurrently, and with other acts not presented and described herein:

```
Lowest-First(K,j,b₁,b₂,...,b_N) {
    1: if (j = 0) then
    2:     exit
    3: end if
    4: Let i be the ID of the bidder whose current bid is b_j(and
       equivalently, b_i).
    5: Let h = O^i(M^i(b^{-i}),b^{-i}), wherein O^i(b)represents bidder
       i's place in a descending bid que, wherein b^{-i} =
       (b¹,...,b^{i-1},b^{i+1},...,b^N) denotes the bids of all bidders other
       than bidder i, and M^i(b^{-i}) denotes bidder i's myopic
       best-response function.
    6: Let F^i(b^{-i})be the forward-looking best-response function
       value for bidder i.
    7: Re-sort the bid sequence, so that h is the slot of the new bid
       F^i(b^{-i})of bidder i.
    8: if (h < j) then
    9:     call Lowest-First(K,j,b₁,b₂,...,b_N),
   10:        else
   11:     call Lowest-First(K,h−1,b₁,b₂,...,b_N)
   12: end if
    }.
```

Figure 6:
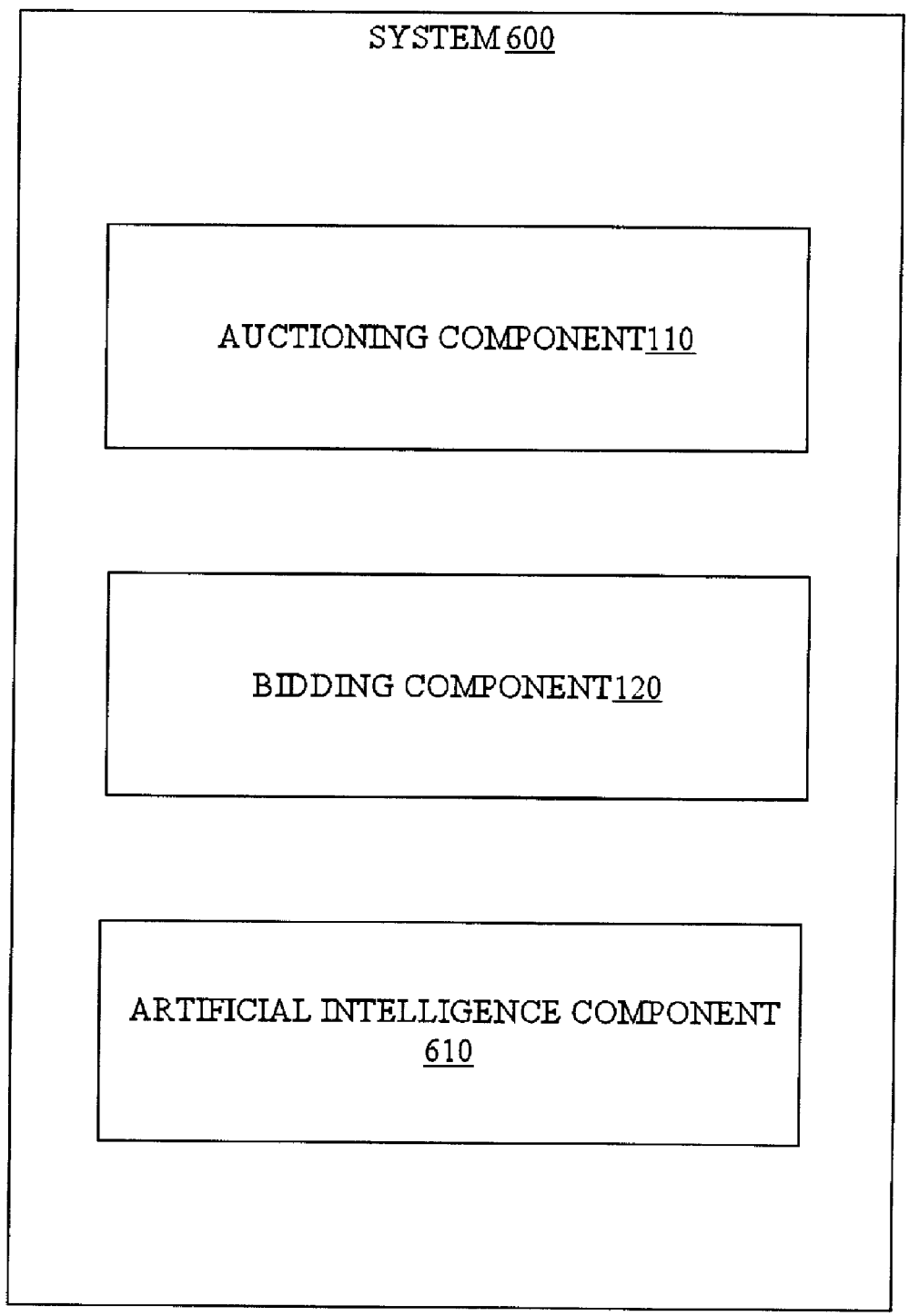
FIG. 6 illustrates a demonstrative system that includes an artificial intelligence component for optimizing bidding agent utility in an ad-words auction, in accordance with an embodiment of the present disclosure.

In the embodiment illustrated by FIG. 6, a system 600 can include an artificial intelligence component 610, in addition to auctioning component 110 and bidding component 120. Artificial intelligence component 610 can enable bidding agents to automatically place bids in an ad-words auction based on, at least in part, the forward-looking best-response function, without the need for human intervention during the bidding process. For example, artificial intelligence component 610 can perform the example process enabled by forward-looking best-response component 310 described above. In another embodiment, artificial intelligence component 610 can further enable bidding agents to automatically update bids utilizing update component 510 based on, at least in part, a Lowest-First updating rule, without the need for human intervention.

Figure 7:
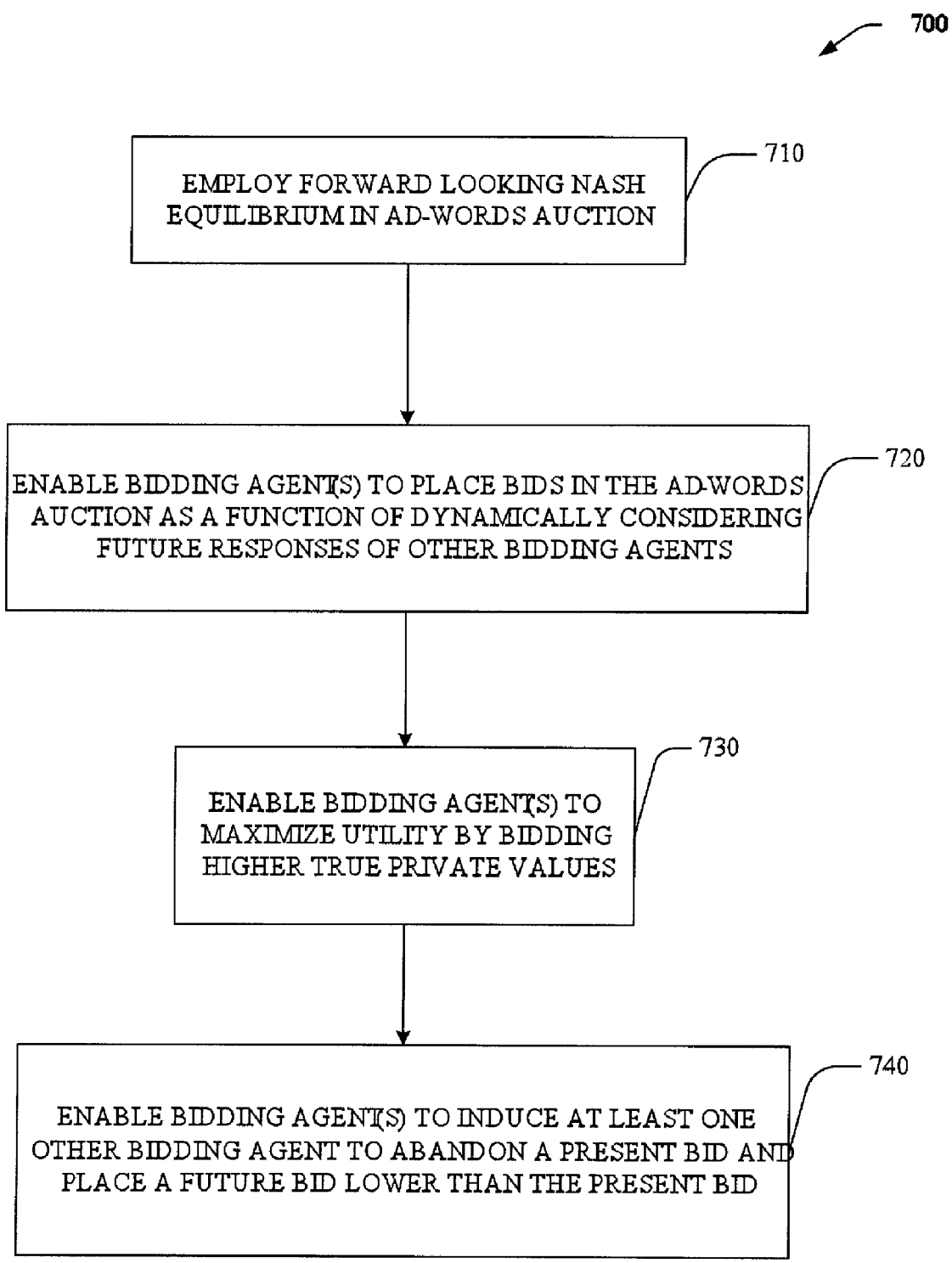
FIG. 7 illustrates a process for employing a forward looking Nash equilibrium in an ad-words auction, in accordance with an embodiment of the present disclosure.
Figure 8:
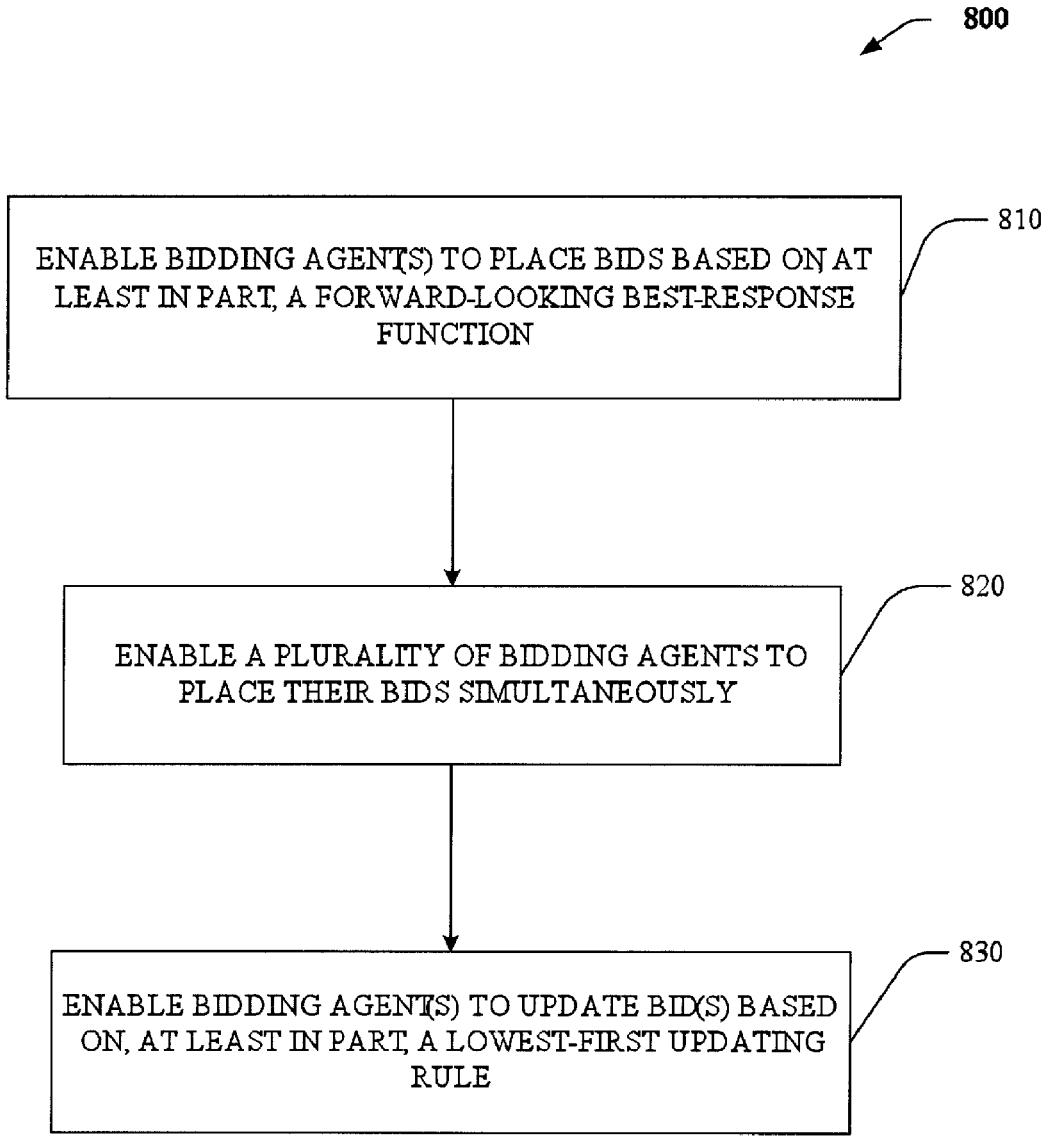
FIG. 8 illustrates another process for employing a forward looking Nash equilibrium in an ad-words auction, in accordance with an embodiment of the present disclosure.
Figure 9:
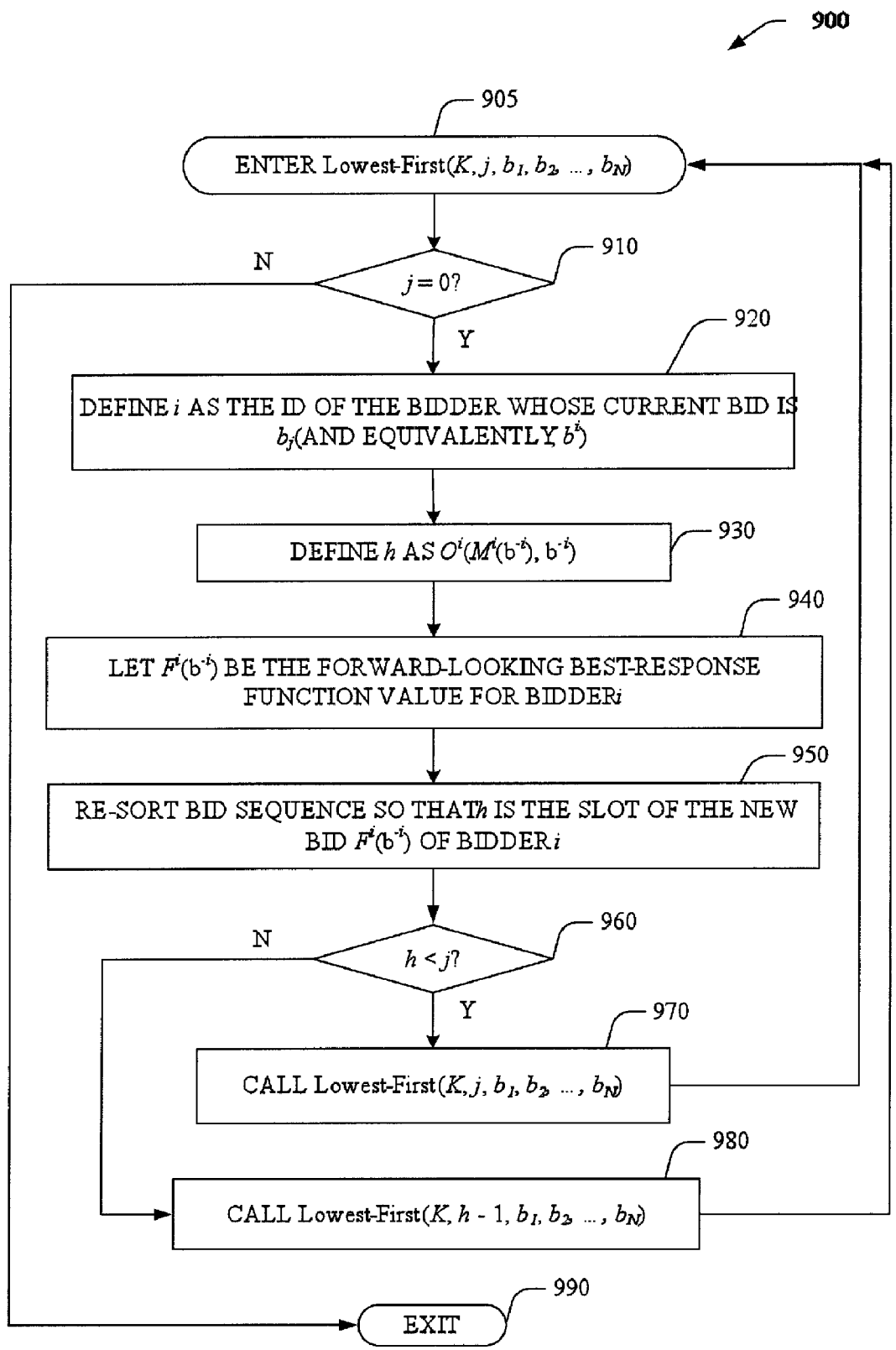
FIG. 9 illustrates a process for updating an ad-words auction based on, at least in part, a Lowest-First updating rule, in accordance with an embodiment of the present disclosure.

FIGS. 7-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, an example forward-looking Nash equilibrium methodology 700 utilized in an ad-words auction is illustrated, in accordance with an embodiment of the present disclosure. As described above, conventional ad-words auction bidding modeled under a pure Nash equilibrium does not maximize agent utility because auction bidders are not enabled to consider the influence their bids have on future decisions of other bidders. Compared with conventional ad-words auction technology, the novel forward looking Nash equilibrium process 700 maximizes bidding agent utility because bidding agents are enabled to consider the effects of existing strategies and potential future responses of other agents. As illustrated in FIG. 7, a forward looking Nash equilibrium is employed in an ad-words auction at 710. At 720, bidding agents are enabled to place bids in the ad-words auction as a function of dynamically considering future responses of other bidding agents.

Bidding agents associated with bids comprising higher true private values are enabled at 730 to obtain advertisement slots within the ad-words auction—the advertisement slots associated with a higher order of attractiveness to viewers. A bidding agent's true private value is based on, at least in part, the bidding agent's estimate of value that at least one user interested in a particular search keyword places on the bidding agent's at least one of product(s) or service(s). At 740, a bidding agent is enabled to induce at least one other bidding agent to abandon a present bid and place a future bid lower than the present bid. Thus, forward looking Nash equilibrium methodology 700 avoids the pitfalls of modeling position auction bidding by the pure Nash equilibrium because it enables agents to dynamically consider future responses of other bidding agents.

FIG. 8 illustrates another process for employing a forward-looking Nash equilibrium in an ad-words auction, in accordance with an embodiment of the present disclosure. At 810, bidding agent(s) are enabled to place bids based on, at least in part, the forward-looking best-response function, as described above. For example, a bidding agent can incrementally increase bidding within a range that maximizes the bidding agent's utility, so as to influence another bidder to abandon a higher advertisement slot. Bidding agents are enabled at 820 to place their bids simultaneously. At 830, bidding agent(s) are enabled to update bids based on, at least in part, a Lowest-First updating rule.

FIG. 9 illustrates a process for updating an ad-words auction based on, at least in part, a Lowest-First updating rule, in accordance with an embodiment of the present disclosure. At 905, the Lowest-First procedure is called. At 910, a determination is made as to whether j=0. If this condition is met, the Lowest-First procedure is exited at 990. If this condition is not met, i is defined, at 920, as the identification (ID) of the bidder whose current bid is $b_j$ (=$b_i$). Further, his defined as $O^i(M^i(b^{-i}), b^{-i})$ at 930, wherein $O^i(b)$ represents bidder i's place in a descending bid que, wherein $b^{-i}=(b^1, \ldots, b^{i-1}, b^{i+1}, \ldots, b^N)$ denotes the bids of all bidders other than bidder i, and $M^i(b^{-i})$ denotes bidder i's myopic best-response function. At 940, $F^i(b^{-i})$ is defined as the forward-looking best-response function value for bidder i. At 950, the bid sequence is re-sorted so that h is the slot of the new bid $F^i(b^{-i})$ of bidder i. A determination is made at 960 as to whether h<j. If this condition is met, a recursive call is made to Lowest-First at 970 with arguments $K, j, b_1, b_2, \ldots, b_N$. If this condition is not met, a recursive call is made to Lowest-First at 980 with arguments $K, h-1, b_1, b_2, \ldots, b_N$.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter. Moreover, the word "exemplary" is used herein to mean serving as an example, instance, or illustration. Any aspect or design described herein as "exemplary" is not necessarily to be construed as preferred or advantageous over other aspects or designs.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
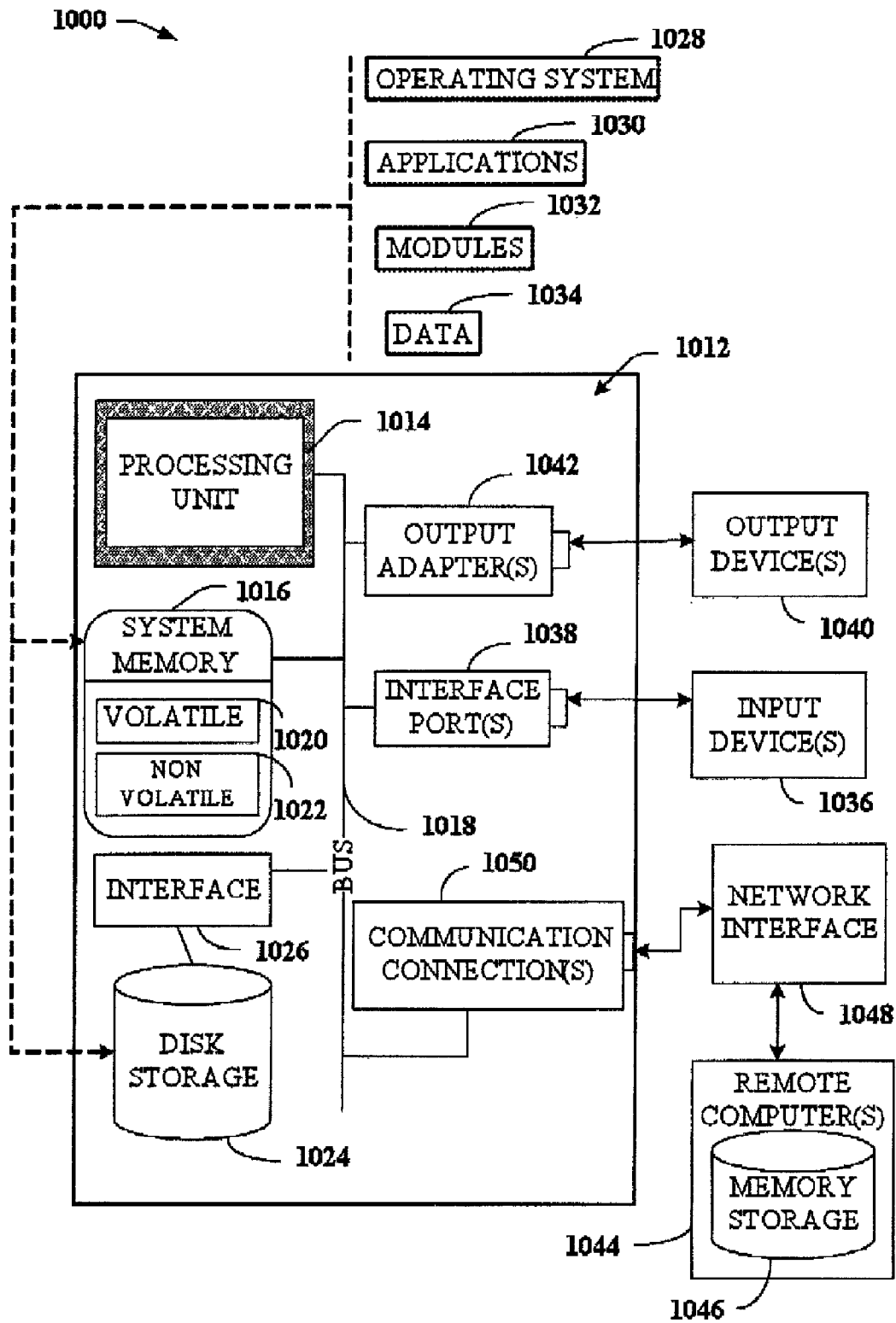
FIG. 10 illustrates a block diagram of a computer operable to execute the disclosed systems and methods, in accordance with an embodiment of the present disclosure.
Figure 11:
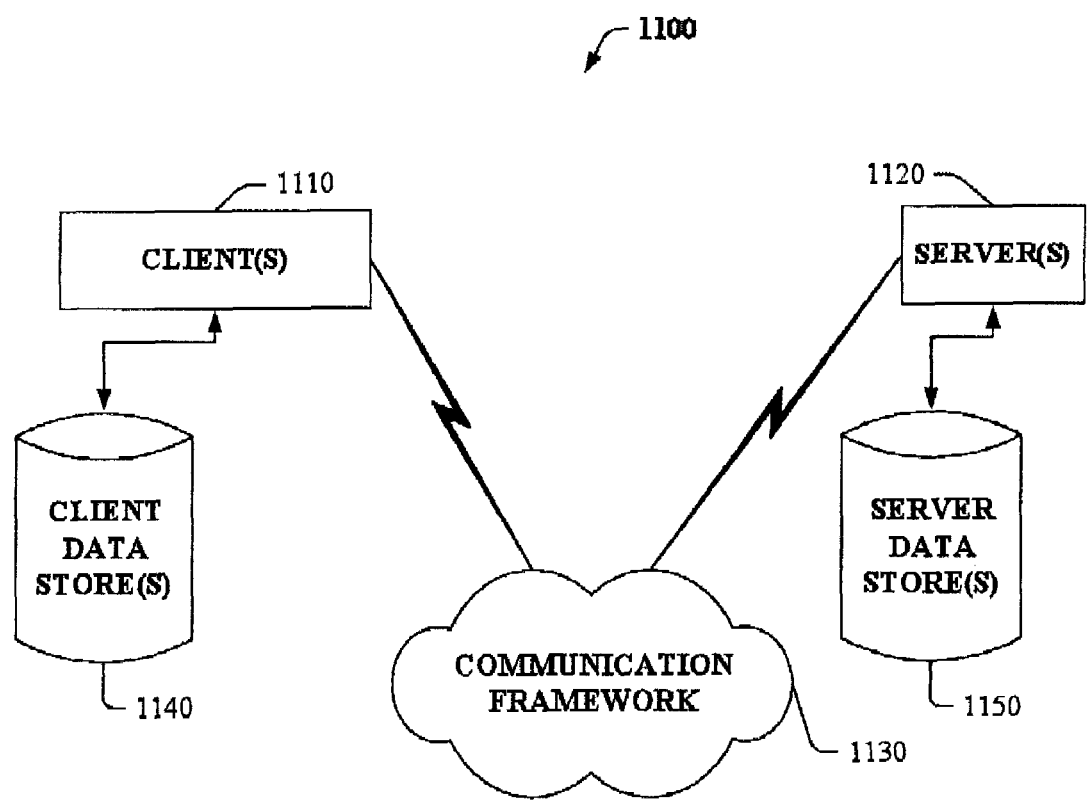
FIG. 11 illustrates a schematic block diagram of an exemplary computing environment, in accordance with an embodiment of the present disclosure.

In order to provide a context for the various aspects of the disclosed subject matter, FIGS. 10 and 11, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, a block diagram of a computer 1000 operable to execute the disclosed systems and methods, in accordance with an embodiment of the present disclosure, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user enters commands or information into the computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 illustrates a schematic block diagram of an exemplary computing environment 1130, in accordance with an embodiment of the present disclosure. The system 1100 includes one or more client(s) 1110. The client(s) 1110 can be hardware and/or software (e.g., threads, processes, computing devices). The system 1100 also includes one or more server(s) 1120. Thus, system 1100 can correspond to a two-tier client server model or a multi-tier model (e.g., client, middle tier server, data server), amongst other models. The server(s) 1120 can also be hardware and/or software (e.g., threads, processes, computing devices). The servers 1120 can house threads to perform transformations by employing the subject innovation, for example. One possible communication between a client 1110 and a server 1120 may be in the form of a data packet transmitted between two or more computer processes.

The system 1100 includes a communication framework 1130 that can be employed to facilitate communications between the client(s) 1110 and the server(s) 1120. The client(s) 1110 are operatively connected to one or more client data store(s) 1140 that can be employed to store information local to the client(s) 1110. Similarly, the server(s) 1120 are operatively connected to one or more server data store(s) 1150 that can be employed to store information local to the servers 1120.

The above description of illustrated embodiments of the present disclosure, including what is described in the Abstract, is not intended to be exhaustive or to limit the invention to the precise forms disclosed. While specific embodiments and examples are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer system comprising:
   a memory having stored therein computer executable components that, when executed, cause the computer system to:
     employ a forward looking Nash equilibrium to facilitate an ad-words auction of advertisement slots; and
     place bids in the ad-words auction based on dynamically considering at least existing strategies of other bidding agents and future responses of the other bidding agents; and
   a processor coupled to the memory to execute the computer executable components.

2. The computer system of claim 1, wherein the memory further comprises computer executable components that, when executed, cause the computer system to:
   enable bidding agents associated with bids comprising higher true private values to obtain advertisement slots within the ad-words auction that are associated with a higher order of attractiveness to viewers; and wherein a bidding agent's true private value is based on, at least in part, the bidding agent's estimate of value that at least one user interested in a particular search keyword places on the bidding agent's at least one of product(s) or service(s).

3. The computer system of claim 2, wherein the memory further comprises computer executable components that, when executed, cause the computer system to:
   determine a profit maximum that enables a bidding agent to maximize the bidding agent's utility in bidding on a position of an advertisement slot.

4. The computer system of claim 3, wherein the advertisement slot comprises a web-link.

5. The computer system of claim 4, wherein the memory further comprises computer executable components that, when executed, cause the computer system to:
   enable the bidding agent to maximize the bidding agent's utility based on at least one of the following: the bidding agent's true private value, an expected frequency the web-link will be selected, or a price charged to the bidding agent associated with a winning bid.

6. The computer system of claim 3, wherein the memory further comprises computer executable components that, when executed, cause the computer system to:
   enable the bidding agent to maximize the bidding agent's utility by inducing at least one other bidding agent to abandon a present bid, and wherein the at least one other bidding agent places a future bid lower in value than the present bid.

7. The computer system of claim 3, wherein the memory further comprises computer executable components that, when executed, cause the computer system to:
   enable the bidding agent to place bids based on, at least in part, a forward-looking best-response function.

8. The computer system of claim 7, wherein the memory further comprises computer executable components that, when executed, cause the computer system to:
   enable a plurality of bidding agents to place their bids simultaneously using a randomized readjustment.

9. The computer system of claim 7, wherein the memory further comprises computer executable components that, when executed, cause the computer system to:
   update a bid in the ad-words auction based on, at least in part, a Lowest-First updating rule.

10. A method for a computer system to facilitate an online ad-words auction comprising:
- employing a forward looking Nash equilibrium at the computer system to facilitate an ad-words auction of advertisement slots; and
- enabling bidding agents to place bids in the ad-words auction as a function of dynamically considering at least existing strategies of other bidding agents and future responses of other bidding agents by providing a communication over a communication connection.

11. The method of claim 10, further comprising:
- enabling the bidding agents to obtain higher valued advertisement slots within the ad-words auction by bidding higher true private values, wherein a bidding agent's true private value is based on, at least in part, the bidding agent's estimate of value that at least one user interested in a particular keyword places on the bidding agent's at least one of product(s) or services(s).

12. The method of claim 11, further comprising:
- enabling a bidding agent to select an advertisement slot that maximizes the bidding agent's utility based on at least one of the following: the bidding agent's true private value, an expected frequency that a sponsored link associated with the advertisement slot will be selected, or a price charged to the bidding agent upon the bidding agent successfully bidding on the advertisement slot.

13. The method of claim 12, further comprising:
- enabling the bidding agent to induce at least one other bidding agent to abandon a present bid, wherein the at least one other bidding agent places a future bid lower in value than the present bid, and wherein inducing the at least one other bidding agent to abandon the present bid maximizes the bidding agent's utility.

14. The method of claim 13, further comprising:
- enabling the bidding agent to place bids based on, at least in part, a forward-looking best-response function.

15. The method of claim 14, further comprising:
- enabling a plurality of bidding agents to place their bids simultaneously.

16. The method of claim 15, further comprising:
- enabling the bidding agent to update bids based on, at least in part, a Lowest-First updating rule, wherein the Lowest-First updating rule enables the bidding agent to update bids based on, at least in part, the forward-looking best-response function.

17. A computer system comprising:
- a memory having stored therein computer executable components that, when executed, cause the computer system to:
  - employ a forward looking Nash equilibrium to facilitate an ad-words auction of advertisement slots;
  - enable a bidding agent of the ad-words auction to obtain an advertisement slot that has a higher level of attractiveness to viewers, wherein the bidding agent bids for the advertisement slot based on, at least in part, the bidding agent's estimate of value that at least one user interested in a particular keyword places on the bidding agent's at least one of product(s) or service(s); and
  - enable the bidding agent to bid based on dynamically considering at least existing strategies of other bidding agents and future responses of the other bidding agents; and
- a processor coupled to the memory to execute the computer executable components.

18. The computer system of claim 17, wherein the memory further comprises computer executable components that, when executed, cause the computer system to:
- enable the bidding agent to bid based on, at least in part, a forward-looking best-response function, wherein the forward-looking best-response function utilizes privately known information of the bidding agent that represents an expected return to the bidding agent per selection associated with the advertisement slot, and wherein the forward-looking best-response function further utilizes a next highest bid in a descending bid queue when there is more than one advertisement slot in the ad-words auction.

19. The computer system of claim 18, wherein the memory further comprises computer executable components that, when executed, cause the computer system to:
- enable the bidding agent to update the bid based on, at least in part, a Lowest-First updating rule, wherein the Lowest-First updating rule enables the bidding agent to update bids based on, at least in part, the forward-looking best-response function.

20. The method of claim 10, wherein the communication comprises a data packet.

* * * * *